April 25, 1961 D. J. AUGER ET AL 2,981,104
FLOW MEASURING SYSTEM
Filed June 24, 1954 5 Sheets-Sheet 1

Inventors
Diana J. Auger
Harold J. Graham
by Roberts, Cushman & Grover
Attys.

April 25, 1961  D. J. AUGER ET AL  2,981,104
FLOW MEASURING SYSTEM
Filed June 24, 1954  5 Sheets-Sheet 3

Inventors
Diana J. Auger
Harold J. Graham
by Roberts, Cushman & Grover
Att'ys.

April 25, 1961 D. J. AUGER ET AL 2,981,104
FLOW MEASURING SYSTEM
Filed June 24, 1954 5 Sheets-Sheet 4

Inventor
Diana J. Auger
Harold J. Graham
by Roberts, Cushman & Grover,
Att'ys

United States Patent Office 2,981,104
Patented Apr. 25, 1961

2,981,104
FLOW MEASURING SYSTEM

Diana J. Auger, Malden, and Harold J. Graham, Boston, Mass. (1541 E. 8 Mile Road, Ferndale, Mich.)

Filed June 24, 1954, Ser. No. 439,004

19 Claims. (Cl. 73—189)

This invention relates to the art of telemetering and more particularly to improvements in telemetric systems for remotely indicating intelligence such as wind conditions, compass headings or the like. This is a continuation-in-part of our application Serial No. 774,564, filed September 17, 1947, now abandoned.

Prior to this invention, telemetering systems for remotely indicating intelligence representative of changes in angular position of a force acting in a plane and more particularly designed for indicating changes of wind conditions such as wind direction or velocity have had a number of disadvantages in that they require the use of relatively complex rotatable apparatus exposed to the wind and other natural elements. Such apparatus, of necessity, had to be protected from the effects of rain and accumulations of snow and ice as well as from corrosive action on metals and their alloys in contact with the atmosphere if it were to be effective and continue to be freely rotatable in accordance with changes of wind direction or velocity. Additionally the prior systems for telemetering information indicative of angular changes of position in a plane have employed either a relatively expensive and complex servo system or a series of commutating switches and electrical contacts to transmit the electrical signals for remote indication of the changes in angular position of the force causing the rotation of the rotatable element. The maintenance required to assure proper operation of the rotatable elements, servo systems, commutating switches, etc., is a rather considerable expense constituting another of the principal disadvantages of the prior art systems. Additional disadvantages of said prior art systems embodying rotating elements, servo systems and commutating switches are more or less obvious, an example of which is the frictional drag and inertia of the apparatus tending to reduce its accuracy and extracting energy from the other elements which may be in the system such as the compass rotor when compass readings are to be remotely indicated.

It is therefore an object of this invention to provide an improved telemetering system for remotely indicating angular changes in position or direction of a force subject to rotation in a plane and more specifically for indicating changes in wind conditions such as wind direction, or velocity, or the like in a manner to overcome the foregoing disadvantages.

It is also an object of this invention to provide an improved telemetering system with a transmitting unit having no moving parts or a minimum of moving parts and adapted to transmit electrical signals indicative of the information to be telemetered without the requirements of commutating switches, servo motors, or electrical contacts and therefore providing a maximum of simplicity and freedom from the loading effects of friction and inertia.

It is a further object of this invention to provide an improved telemetric system employing the principles of heat exchange to transform the change in angular position of a condition to be observed into an electrical signal at the transmitting station such that no moving parts or minimum of moving parts are required.

Still another object of this invention is to provide an improved system for remotely indicating wind conditions such as wind direction and velocity, the transmitting device subject to the vagaries of the wind being protected from the elements and functioning to prevent the accumulation of snow or ice in a manner to assure reliable operation in all types of weather with a minimum of maintenance, and without special provisions for continuously heating the transmitting device.

In one form of the telemetric system of the invention especially designed to remotely indicate changes in wind conditions such as wind direction and velocity, the transmitting unit may be provided with a number of temperature sensitive electrical resistors radially spaced at different known angular positions within an approximately horizontal plane and exposed to the vagaries of the wind. The electrical resistors are preferably selected to be formed of a material having a high temperature coefficient, either positive or negative, within the intended temperature range of operation. Electric circuit means are also provided at the transmitting unit to pass an electric heating current through the resistors in a manner to measure their change in resistance due to the cooling effects of the heat exchange with the wind. Therefore, the temperature sensitive resistor in the radial position immediately facing the wind would become coolest and have the greatest change in resistance. The resistance units may be sealed in high thermal conductivity material, such as hydrogen, to promote this effect. Suitable circuit means are also provided for transmitting electrical signals representative of the resistance changes of the respective resistors to a receiver or remote indicating unit for indicating the radial position of the particular resistor having the change in resistance and thereby indicating the wind direction. Remotely positioned means to indicate the amount of resistance change due to the cooling effect of the wind which change in resistance is directly proportional to the velocity of the wind may also be provided, to be calibrated in terms of wind velocity and thus indicate the velocity of the wind simultaneously with the indication of the wind direction.

In the telemetric system of the invention described in the foregoing paragraph, a number of respective electrical bridge circuits may be used for the specific circuit means to pass an electric heating current through the various temperature sensitive resistors subjected to the vagaries of the wind and for transmitting electrical signals representative of the changes in the resistance of the various temperature sensitive resistors due to the change in wind direction or velocity. In such an arrangement the electrical bridge circuits are preferably balanced for the condition when no wind is blowing from any direction. A subsequent condition of wind blowing from a particular direction will then alter the resistance of a selected temperature sensitive resistor unbalancing the respective bridge circuit and causing current to flow in a selected direction in the output circuit of the bridge which may be electrically connected to suitable remote indicating means for indicating the direction of current and hence the wind direction and for indicating the amount of current flow and hence the wind velocity.

The transmitting unit used in the telemetric system described in the foregoing paragraphs may assume several specific forms depending upon the expected conditions of use. In one embodiment, the temperature sensitive resistors may be mounted within suitable wind receiving pockets or channels radially disposed in an appropriate horizontal plane and adapted to be exposed directly to the wind to be cooled thereby as the wind blows from a particular direction. In another embodiment, a transmitter including a housing of non-metallic poorly heat conducting material is located at a predetermined control point at which it is subjected to impingement by flow of the fluid from all directions, at least three temperature-sensitive impedance elements are arranged in the housing essentially without heat transferring relation therewith, the said elements being respectively associated with spaced portions of the housing in spaced non-linear arrangement and in a plane generally parallel to the said predetermined plane so as to be primarily affected by fluid flow in different predetermined directions respectively, whereby said elements will have a resultant temperature differential condition characteristic of the fluid flow direction; and a receiver is located at an observation point remote from the transmitter and comprises a ratiometer including a plurality of deflecting coils, each connected in a circuit with a source of current and with one of the said elements, the different temperatures of the elements caused by the fluid flow acting to control the current through each of said coils respectively in a manner corresponding to the temperatures of the respective elements as determined by the fluid flow direction.

The telemetric system of this invention, as previously described, employs the general principles of heat exchange to effect a change in resistance of a temperature sensitive resistor element having a high temperature coefficient. Instead of relying upon the cooling effect of the wind as previously described to effect the change in resistance, a source of heat such as an infrared lamp or the like can be selectively exposed to the resistors in accordance with a change in angular direction of a force to provide a change in resistance for a selected resistor in accordance with an increase of temperature for that resistance. Such an arrangement is therefore adaptable for telemetering intelligence representative of any angular change in direction of a force such as the change in angular position of a compass rotor, wind vane or the like. The mechanism for selectively focusing the heat source upon radially disposed temperature sensitive resistor elements or for selectively shading respective resistor elements from the heat source can comprise an exceedingly light and freely rotatable element subject to the changes in angular position of the compass rotor, for example, and therefore having a minimum of inertia, friction, and energy extraction from the compass rotor so that the accuracy of the compass is unimpaired.

Additional objects and advantages of the telemetering system of this invention will be apparent from the following specification and drawings in which.

Figure 1:
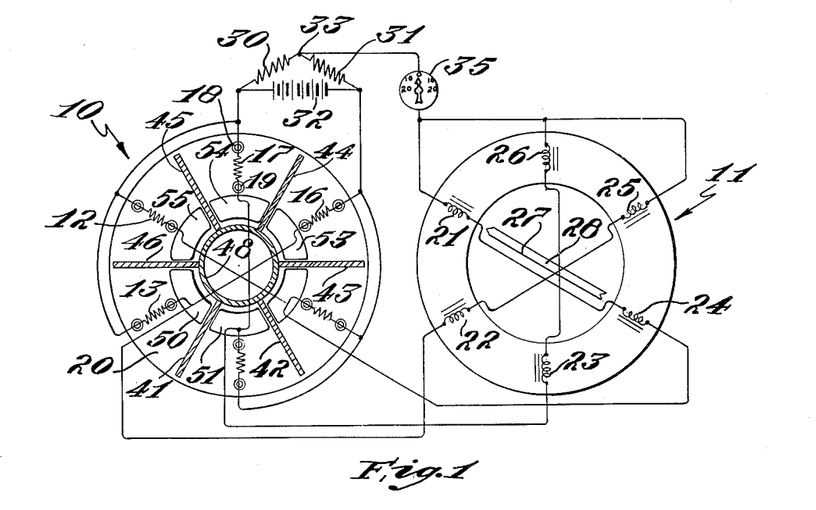
Fig. 1 is a diagrammatic illustration of one form of telemetering system of this invention and showing both the transmitting and receiving units and the electrical circuit connections therebetween.
Figure 2:
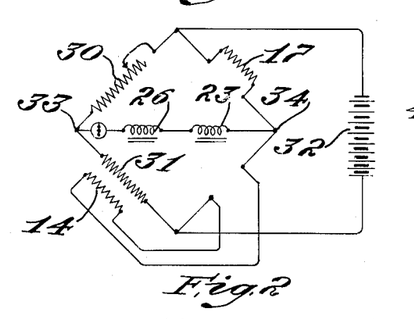
Fig. 2 is a simplified schematic diagram of the basic electrical bridge circuit used in the system of Fig. 1.

Referring to the telemetric system shown in Fig. 1 of the drawings as specifically adapted to indicate wind conditions, a transmitting unit 10 and a receiving unit 11 are shown to be electrically connected in a number of respective bridge circuits similar to the basic electrical bridge circuit illustrated by the simplified wiring diagram of Fig. 2 of the drawings. The transmitting unit 10 comprises a plurality of radially disposed temperature-sensitive resistors 12—17 adapted to be exposed to the vagaries of the wind. The resistors 12—17 are preferably selected to have a high coefficient of resistance with respect to temperature changes and they may be formed, for example, of filamentary tungsten wire suitably coiled and mounted upon insulating posts such as the posts 18 and 19 supporting the resistor 17. The insulating mounting posts for the resistors 12—17 are fastened upon a suitable supporting plate member 20. The resistors 12—17 may preferably be of an even number and radially disposed at equal angles to each other above the surface of the plate so as to provide oppositely disposed resistors around a circle in a common plane. Thus, upon fixing the position of the plate 20 with respect to a known angular direction in the plane of the plate, the resistors 12—17 will be similarly mounted in known angular positions in the plane of the plate. In actual use, the supporting plate 20 is intended to be mounted in an approximate horizontal plane in a manner to expose the temperature-sensitive resistors 12—17 to the cooling effects of the wind coming from any direction in a generally horizontal plane.

The remotely positioned receiving unit 11 may be comprised of a number of solenoid coils 21—26 radially disposed in a common plane at angular positions to each other similar to the angular positions of the resistors 12—17. A magnetized compass needle or other magnetized indicator pointer 27 is pivotally mounted at 28 to be rotated to an angular position corresponding to the changes in polarity and magnetic field intensities of the respective pairs of magnet coils such as 21 and 24 when energized from the transmitting unit 10 in a manner to be later described. It should be pointed out that maximum energizing current passes from one pair of magnet coils such as 21, 24 or 22, 25 or 23, 26 to the next as the wind shifts, with two adjacent pairs having equal energization with the wind direction bisecting their angle.

In order to better understand the telemetering system thus far described in connection with Fig. 1 of the drawings, reference is made to the simplified wiring diagram of one of the respective electrical bridge circuits as shown in Fig. 2 of the drawings. In the bridge circuit shown in Fig. 2 of the drawings, the oppositely disposed, temperature-sensitive, wind-responsive resistors 14 and 17 are connected as adjacent resistance arms of the electrical bridge while the opposite resistance arms of the bridge are formed of non-temperature-sensitive or wind-responsive resistor elements 30 and 31. The material forming the non-temperature responsive resistor elements 30 and 31 may be of any known electrical resistance material having substantially a zero coefficient of temperature or other types of resistor elements may be used so long as they have similar coefficients of temperature to the wind-responsive resistors 14 and 17 and are exposed to the same ambient temperatures as the wind-responsive temperature-sensitive resistors 14 and 17. The power input to the bridge circuit may be supplied from the battery 32 while the unbalanced bridge current output appearing across the bridge output terminals 33 and 34 is connected in series with magnet coils 23 and 26. It will be understood that the simplified bridge circuit shown in Fig. 2 of the drawings is operative for two primary directions of wind only, such as north and south, depending upon the initial orientation of the transmitter supporting plate 20. The non-wind-responsive opposite bridge legs formed by the resistors 30 and 31 are in the circuit of Fig. 1 connected to be common to the respective bridge circuits including temperature-sensitive, wind-responsive resistors 12, 15 and 13, 16 for the other four primary directions of wind to be telemetered, as shown. Of course, each of the respective bridge circuits for the respective pairs of oppositely disposed temperature-sensitive resistors may be provided with indiivdual non-temperature or wind responsive resistors in the opposite bridge legs if desired.

In operation of the system thus far described in connection with Figs. 1 and 2 of the drawings is as follows. With the battery connected as shown, an electric current is circulating in the respective bridge circuits such as the bridge circuit including resistors 30, 31, 14 and 17 and all of the respective bridge circuits are adjusted to a condition of balance when no wind is blowing on the temperature-sensitive wind-responsive resistors 12—17. The circulating current through the temperature-sensitive wind-responsive resistors 12—17 is sufficient to elevate their temperatures above the ambient temperature which in cold weather is therefore effective to prevent the formation of snow and ice upon the housing of the temperature-sensitive wind-responsive resistors 12—17 exposed to the vagaries of the wind and weather elements. Assuming the wind to commence blowing in a direction to cool the temperature-sensitive resistor 17, the respective bridge circuit shown in Fig. 2 of the drawings will become unbalanced due to the change in resistance of resistor 17 to cause a current to flow in a selected direction between the output terminals 33 and 34 through the magnet coils 23 and 26. Electro-magnets 23 and 26 will therefore become magnetized to create a magnetic field polarized to attract the magnetized pointer 27 in a direction to point toward the magnet coil 26. Should the wind change to the opposite direction and therefore cool temperature-sensitive resistor 14 instead of resistor 17, the direction of current through the magnet coils 23 and 26 would be reversed and the magnetized pointer 27 would move to the opposite position pointing toward the magnet coil 23, assuming the magnet coils to be polarized in that manner.

It should be understood that in the system shown in Fig. 1 of the drawings, the magnetic fields of the various magnet coils 21—26 will be distributed circumferentially around the plane of the indicating device so that the pointer 27 will be responsive to indicate all variations of wind direction between those primary wind directions of blowing exactly upon the respective ones of the radially disposed resistors 12—17.

At the time when no wind is blowing and all of the respective bridge circuits are balanced so that no current is flowing through any of the magnet coils 21—26, the magnetized pointer 27 may come to rest at its last indicating position which would erroneously indicate a wind to be blowing from a certain direction although in fact no wind is blowing at all. In order to indicate that all of the respective bridge circuits are balanced, a galvanometer 35 may be placed in the common lead for the bridge circuits to the bridge output terminal 33 and this galvanometer will indicate by a zero reading that the bridge is balanced and hence no wind is blowing regardless of the last direction indicated by the magnetized pointer 27. A current sensitive relay may be used in a suitable signalling circuit in place of the galvanometer 35 as should be readily understood.

In the electrical system as shown, the total amount of current unbalance for the respective bridge circuits is directly proportional to the velocity of the wind or the amount of cooling thereby upon the respective ones of the temperature-sensitive wind-responsive resistors 12—17. Therefore the galvanometer 35 may be calibrated directly in terms of wind velocity since the amount of total bridge current is directly proportional to the total bridge unbalance due to the intensity of the wind. It is understood, as previously described, that the unbalanced bridge current may be in either of two directions and therefore the galvanometer must be calibrated in terms of wind velocity on either side of zero reading. For extreme accuracy of wind velocity indication it may be desirable to compensate in any known manner, the bridge circuits for changes in the ambient temperature although such arrangement is not shown.

The structural details of the transmitting unit 10 shown in Fig. 1 of the drawings may assume various forms such as those shown in Figs. 1, 3 or 8–13 of the drawings. In the form shown in Figs. 1 and 3 of the drawings the temperature sensitive resistors 12—17 are mounted upon the insulating posts such as 18 and 19 supported upon the circular base or supporting plate 20. The supporting plate 20 may be mounted upon the end of a suitable supporting post 40. A number of vertically disposed and radially arranged partition walls 41—46 are edge mounted at right angles to the supporting plate 20, as shown, to isolate the respective ones of the temperature-sensitive wind-responsive resistor elements from each other in suitable wind-receiving pockets. A top plate or sunshade 47 is also secured to the upper horizontal edges of the partitions 41—46 to shield the temperature-sensitive resistors from the direct rays of the sun. An inner circular hub wall 48 is provided and arranged to prevent the wind from blowing entirely through the transmitting unit from one wind-receiving pocket to the opposite wind-receiving pocket, and openings 50—55 in the bottom plate 20 permit the wind entering the pockets to escape and thus allow circulation through the pockets.

Figure 3:
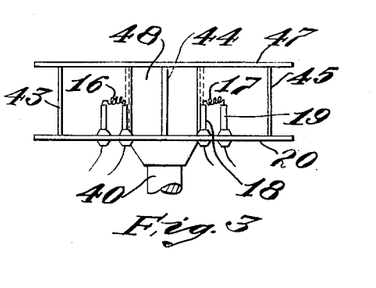
Fig. 3 is a side elevation of the transmitting unit shown in Fig. 1.

With such an arrangement as described in connection with Figs. 1 and 3 of the drawings, it will be seen that the temperature-sensitive wind-responsive resistor elements 12—17 are radially disposed in suitable wind-receivng pockets to be selectively exposed to the wind blowing from any direction in the general horizontal plane of the supporting plate 20 as herein described, the temperature-sensitive resistors are shielded from the rays of the sun in order to prevent temperature caused effects not dependent upon the wind shift. Also, these resistors are individually heated by the passage of the circulating bridge current so that the formation of snow and ice is prevented while still being exposed to the direct cooling effects of the wind.

Figure 4:
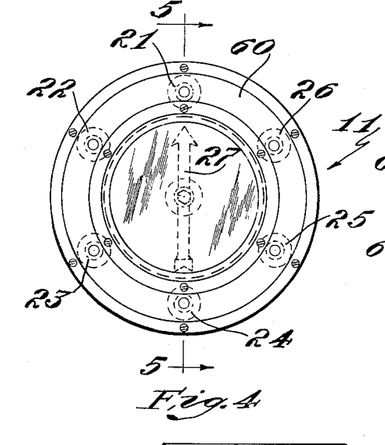
Fig. 4 is a plan view of a preferred form of receiving indicator unit diagrammatically shown in Fig. 1.
Figures 5, 10:
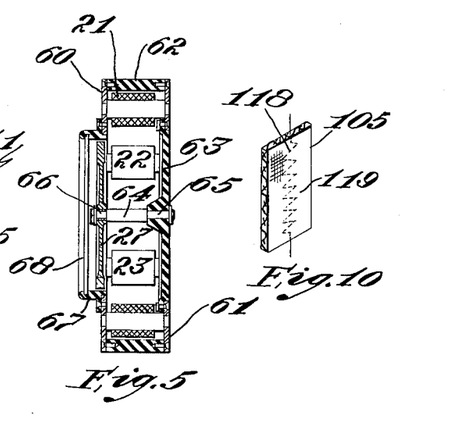
Fig. 5 is a vertical section on the line 5—5 of Fig. 4.
Fig. 10 is a perspective view of one of the temperature-sensitive resistors used in the transmitting unit of Figs. 8 and 9.

The indicating or receiving device 11 shown in Fig. 1 of the drawings may assume various structural forms and a preferred form is shown in Figs. 4 and 5 of the drawings. The electro-magnet coils 21—26 are radially disposed in an upright position between the metal rings of magnetic material 60 and 61. The metal rings 60 and 61 may be screwed at their outside edges to the separating sidewall ring member 62 of composition material and the inner edge of the bottom ring 61 may be fastened to a suitable base-supporting disc 63 also of composition material or the like. A pivot post 64 is secured at 65 to the center of the base-supporting disc 63 and its upper end is arranged to pivotally journal with a jewel or other suitable bearing 66 the magnetized indicator pointer 27. A gasket 67 and transparent face plate 68 may also be provided to completely enclose the operating mechanism of the indicating and receiving device 11. The provision of the circular metal rings of magnetic material 60 and 61 is advantageous in that it facilitates the connection and distribution of the magnetic fields from the respective pairs of magnet coils such as 21, 24 and 22, 25 which may be energized to varying degrees due to the wind blowing from various directions intermediate the primary directions exactly in alignment with the radially disposed temperature-sensitive wind-responsive resistors. The indicating and receivng device 11 may be provided with suitable calibrations on its face for indicating the wind direction in terms of its relation to the position of the transmitting unit. When the transmitting unit is at a fixed location such as on a building, the receiving device 11 may be calibrated with compass designations such as north, south, etc. On the other hand, when the transmitting device is mounted upon a movable location such as an ocean-going vessel, the receiving device 11 may be calibrated in terms of the wind direction with relation to the direction in which the ship is heading.

Figures 6, 7:
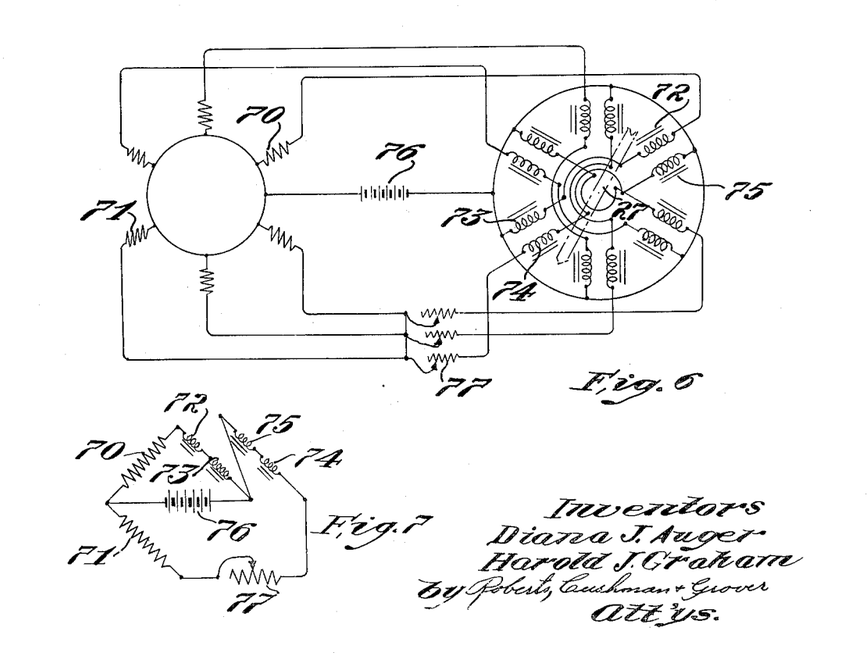
Fig. 6 is a diagrammatic illustration of a modified circuit arrangement for the telemetering system of the invention.
Fig. 7 is a wiring diagram of the basic electrical bridge circuit used in the telemetering system shown in Fig. 6.

A modified form of electrical bridge arrangement and associated electric indicating device which may be used in the telemetric system of this invention is shown in Figs. 6 and 7 of the drawings. In this arrangement the temperature-sensitive wind-responsive bridge resistor elements 70 and 71 as positioned to respond to opposite wind directions are connected as the adjacent bridge resistance legs while the opposite bridge resistance legs are each comprised of a pair of oppositely positioned magnet indicator coils 72, 73 and 74, 75. The magnet coils 72 and 74 are wound oppositely to each other as is also the case with the magnet coils 73 and 75 and such oppositely wound coils are positioned side by side within the indicator housing so that equal currents through coils 72 and 74 or 73 and 75 will produce opposing magnetic fields to completely cancel each other. A battery 76 is connected as shown to supply the circulating bridge current and adjusting means, such as the multiple rheostat 77, may be used to initially balance the respective bridge circuits for a condition when no wind is blowing. In order to simplify the description no additional reference will be made to the other respective bridge circuits for the other primary directions of wind since they are merely duplications of the circuit shown in Fig. 7 of the drawings as connected with the temperature-sensitive wind-responsive resistors disposed in other angular positions.

The operation of the telemetering system described above in connection with Figs. 6 and 7 of the drawings will be apparent from the following description of the operation of one of the respective bridge circuits such as shown in Fig. 7. The rheostat 77 is initially adjusted to balance the bridge circuit when no wind is blowing so that the electrical magnetizing and bridge currents flowing through magnet coils 72, 74 and 73, 75 are equal. Now, assuming the wind to blow in a direction to cool the temperature-sensitive resistor 70 without cooling the temperature-sensitive resistor 71, the bridge will then be unbalanced to cause more current to flow through one pair of magnet coils 72, 73 than through the other pair of magnet coils 74 and 75. Therefore the total magnetic fields produced by oppositely positioned coils 73 and 74 and oppoistely wound similarly positioned coils 72—75 will not cancel each other and the magnetic indicator needle 27 will thus be moved to a position according to the polarity of the resultant magnetic fields produced by coils 73, 74 and 72, 75. Assuming the direction of the wind to be reversed such that resistor 71 is cooled without cooling resistor 70, the polarity of the resultant magnetic fields produced by coils 73, 74 and 72, 75 will be similarly reversed and the magnetic indicator pointer 27 will assume the opposite position.

Figure 8:
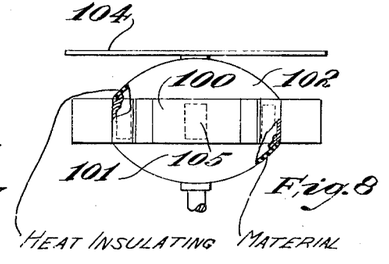
Fig. 8 is a side elevation of one preferred form of transmitting unit in which the temperature-sensive resistors are fully enclosed.
Figure 9:
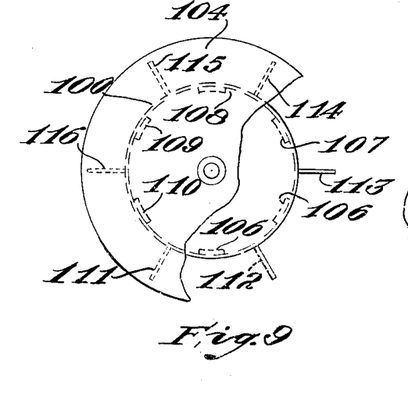
Fig. 9 is a plan view of the transmitter unit shown in Fig. 8.

The transmitting unit embodying the temperature-sensitive wind-responsive elements for use with either of the systems of Fig. 1 and Fig. 6 may be arranged to fully enclose the temperature sensitive resistors if desired. Such an arrangement is shown in Figs. 8–10 of the drawings. As shown in Fig. 8, a metallic ring 100, preferably of high heat conductivity such as silver, is provided with top and bottom enclosing cones 101 and 102 which may be of composition heat insulating material. The upper conical end 102 is provided with a sunshade disc element 104. Fastened at equal angularly disposed positions to the inner circumferential wall of the metallic ring 100 are a number of temperature-sensitive wind-responsive resistors 105—110. The temperature-sensitive resistors, for example 105, may be formed as shown in Fig. 10 of the drawings to comprise a tungsten filament 118 imbedded in an electrical insulating sheath of cotton 119 or other suitable fibrous material and the resistor may then be secured to the inner wall of the metallic ring 100 by gluing the cotton sheath 119 thereto. Radially disposed vanes 111—116 may also be provided about the exterior walls of the heat conducting ring 100 to segregate the cooling effects of the wind blowing on respective areas of the wall in heat exchanging relation to various ones of the temperature-responsive resistor elements with respect to the others. The operation of such a device should be apparent, it being understood that the circulating bridge current through the temperature-sensitive resistor elements 105—110 is effective to heat the metallic side wall 100 substantially uniformly around its periphery. The wind then blowing upon a selected area of the side wall 100 facing the wind will thus cool that area of the wall 100 and the temperature-sensitive resistor closest to that area of the side wall thus changing its resistance and unbalancing the bridge circuit in a direction to actuate the remotely positioned indicating device to indicate such wind direction as previously described.

The telemetering system of this invention as described thus far has been specifically designed to transmit electrical signals indicative of wind direction on velocity to a remote indicating device. The system employs the principles of heat exchange in that the cooling effect of the wind is used to alter the resistance of a temperature-sensitive resistor. The system may be modified as described in the following paragraphs while still using the principles of heat exchange and the temperature-sensitive resistors to remotely indicate changes in angular direction of any force acting in a plane and thus may be used to transmit electrical signals indicative of the change in position of a compass rotor or the like.

Figure 11:
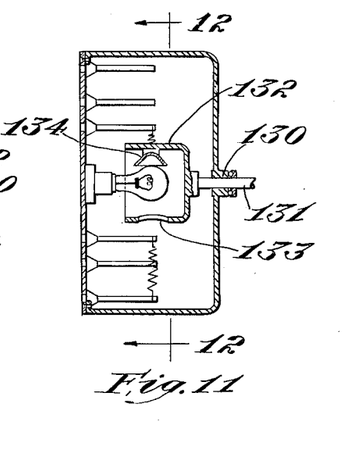
Fig. 11 is a vertical half-section through another form of transmitter unit for use in the telemetric system of the invention, the arrangement being such that heat is selectively directed upon the various ones of the radially disposed temperature-sensitive resistors.
Figure 12:
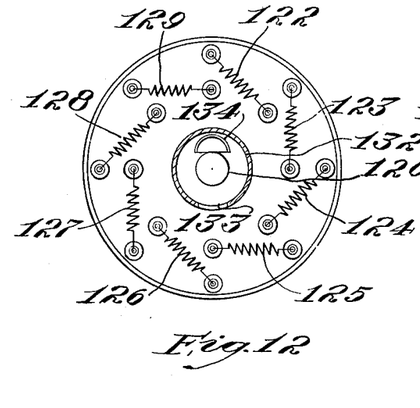
Fig. 12 is a plan view seen in the direction of the arrows on the line 12—12 of Fig. 11.

A modified form of transmission device specifically adapted to transmit electrical signals indicative of changes of angular position of the rotary shaft is shown in Figs. 11 and 12 of the drawings. In such arrangement a source of radiant heat such as the infra-red lamp 120 is mounted within the cylindrical enclosure 121 as shown. Radially spaced adjacent the circumferential walls within the cylindrical enclosure 121 are a number of temperature-sensitive resistor elements 122—129. Rotatably journaled by the bearing 130 mounted at the center of the end wall opposite the infra-red lamp 120 is a shaft 131 supporting a cup enclosure 132 adapted to surround the body of the lamp 120. The cup enclosure 132 is provided with an opening 133 through which radiant energy from the lamp 120 is focused by the reflector 134. The rotary shaft 131 may be connected to a compass rotor or the like to be rotated thereby and assume an angular position corresponding to the position of the compass rotor.

It should be apparent that the cup 132 is effective to shield the direct energy of radiant heat of the infra-red lamp 120 from all of the temperature-sensitive resistors except those within the direct range of the reflector 134 and the opening 133. Thus selective ones of the temperature-sensitive resistors 122—129 are heated to an increased temperature by the focused heat of the infra-red lamp 120 in accordance with the angular position of the shaft 131 and cup 132. The heating of the temperature-sensitive resistors is effective to change their resistance and they may be electrically connected in bridge circuits similar to those previously described in connection with Figs. 1 and 6 of the drawings and associated with a remote indicating device such as described in connection with Figs. 4 and 5 of the drawings. It will be noted that there is no mechanical or magnetic connection between the rotary shaft 131 and the source of electrical signals (namely the temperature-sensitive resistors) and therefore that the rotation of the shaft 131 in accordance with the position of the compass rotor or the like does not extract any appreciable energy from the compass rotor. The cup housing 132 may be constructed of very light material such as thin sheet aluminum and the bearing 130 may be designed to offer a minimum of friction so that the rotation of the shaft 131 is essentially effortless.

Figure 13:
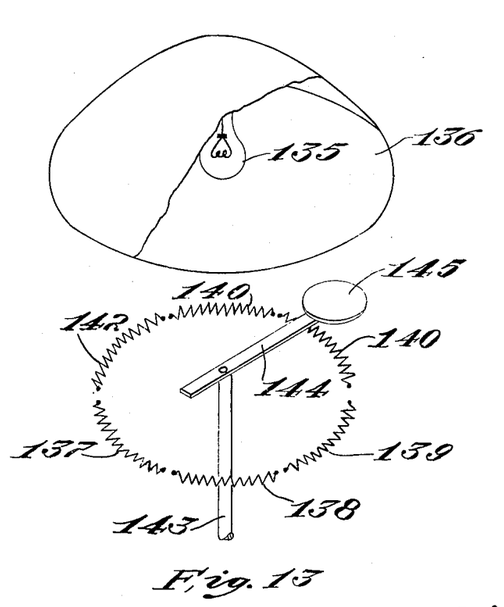
Fig. 13 is a perspective elevation in diagrammatic form of another form of transmitting unit used in the telemetric system of the invention, the arrangement being such as to provide means for selectively shading respective ones of radially disposed resistors from a source of radiant heat.

The modified form of transmitting device described above in connection with Figs. 11 and 12 of the drawings employs the principles of heat exchange to selectively focus a source of radiant heat upon temperature-sensitive resistors to thus alter their resistance and produce an electrical signal. In Fig. 13 of the drawings another variation of such an arrangement is shown in which the radiant heat is continuously focused on all of the temperature-sensitive resistors while selectively shading one or more of the resistors from the heat source. As shown, the heat source may comprise an infra-red lamp 135 adapted to generate radiant heat to be focused by the parabolic reflector 136 upon the radially disposed temperature-sensitive resistors 137—142 mounted in a common plane. A rotary shaft 143 is journaled on suitable bearings (not shown) and carries thereby an arm 144 and shading disc 145 adapted to be interposed between selective ones of the temperature-sensitive resistors 137—142 and the radiant heat source. Rotation of the shaft 143 in response to a change in position of the compass rotor or the like will cause a corresponding movement of the shading disc 145 to selectively shade a corresponding temperature-sensitive resistor from the heat source and thus its electrical resistance will be changed in relation to the electrical resistance of the other temperature-sensitive resistors exposed to the heat source. It should be apparent that such an arrangement is capable of responding to changes in position of a compass rotor or the like without extracting any appreciable energy from the compass rotor since there is no mechanical connection between the rotary shaft 143 and the electric signal generating devices. It should be understood that the transmitter arrangement shown in Fig. 13 of the drawings may also be used with the bridge circuits and remote indicating device that have been previously described in connection with the wind condition indicating form of the invention.

The two embodiments now to be described with reference to Figs. 14 to 18 are particularly practical from a production and operational point of view since they assure, like the previously described embodiments, accurate and quick response to comparatively minute temperature differentials, and are moreover of especially simple construction and not subject to obstruction or other impairment of operation by external effects including accumulation of wind carried material. Both embodiments, similar to those described with reference to Figs. 1 to 10, do not rely on a good heat transferring relation between the temperature-sensitive impedance elements and the housing, so that the relative temperatures of housing and detecting impedance elements are essentially immaterial.

Figure 14:
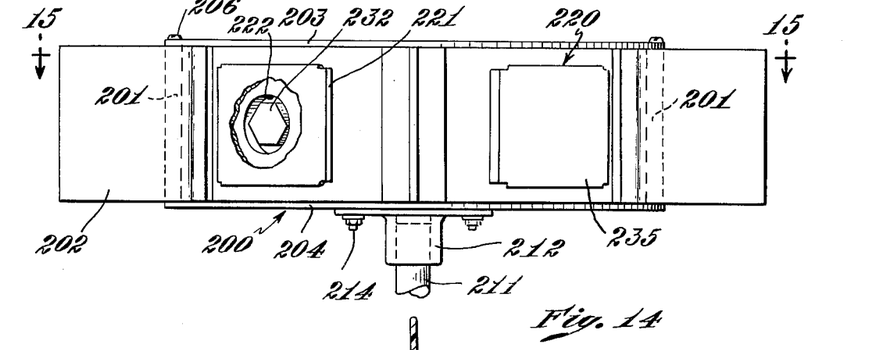
Fig. 14 is the elevation of a further embodiment of a transmitting unit according to the invention.
Figure 15:
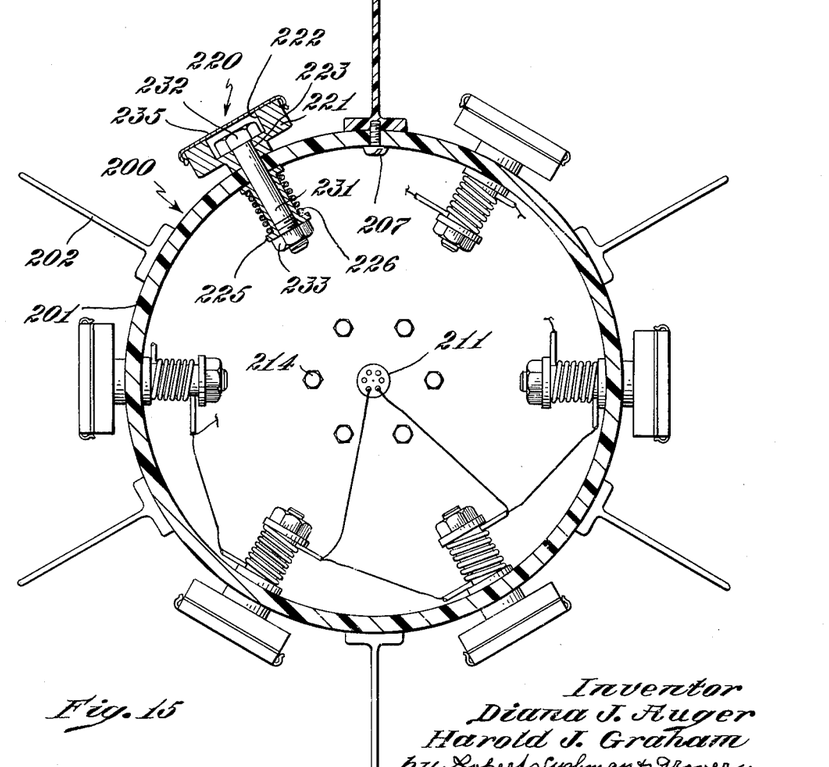
Fig. 15 is a section on lines 15—15 of Fig. 14.

It will be understood that all embodiments of the present invention as herein described operate satisfactorily with the individual temperatures of the impedance elements averaging to the ambient temperature. It might sometimes be advisable to raise this ambient temperature artificially, such as by heating the interior or exterior of the housing, for example by blowing warm air into the housing through the hollow support such as shown in Figs. 14 and 15 or by heating the entire apparatus electrically. It was found that such expedients do not appreciably affect the effective temperature differential which indicates the wind direction, apart from the beneficial effect which they might have in maintaining the transmitter in operative condition generally speaking, such as by melting ice accumulating thereon.

Figs. 14 and 15 show a housing 200 of insulating synthetic material, such as for example Lucite, similar in shape to those shown in Figs. 1, 3, 8 and 9. This housing consists of a cylindrical body 201 which can be cut from standard stock, of an appropriate number, such as six, fins 202 of the same material for example extruded T stock, and two covers 203, 204 which do not extend beyond the housing proper 201. The fins and covers are screwed to the tubular body, as indicated in the figures at 206, 207.

The housing is supported for example on a pipe 211 to which is fastened a flange 212 that is in turn bolted to the bottom 204 of the housing, as indicated at 214.

The tubular body 201 carries a requisite number, in this instance six, detecting elements 220 which are constructed as follows. A generally speaking rectangular detector body 221, of cast metal, such as for example copper, bronze or aluminum has a central recess 222 leading into a hole 223. A flanged metal sleeve 225 carries wound thereon an insulated resistance wire 226 of high temperature coefficient, such as iron or a suitable iron alloy. The insulation of this resistance wire can be quite thin since the potential differences between the turns of the windings are quite low. A bolt 231, with a head 232 within the recess 222 of the body 221, and with a nut 233 secure the body 221 outside of the housing and the sleeve 225 within the housing body 201. The recess 222 can be covered with a metal snap-on spring cover 235.

The ends of resistance wire spools 226 are connected in a suitable circuit, such as described above with reference to Figs. 1, 2, 6 and 7, and the transmission wires can be brought out from the housing through the hollow support 211, as indicated in Fig. 15.

It will be noted that the housing 200 is of non-metallic poorly heat conducting material, and that the temperature differential between the detecting elements 220 do not depend on the temperature condition of the housing.

Figure 16:
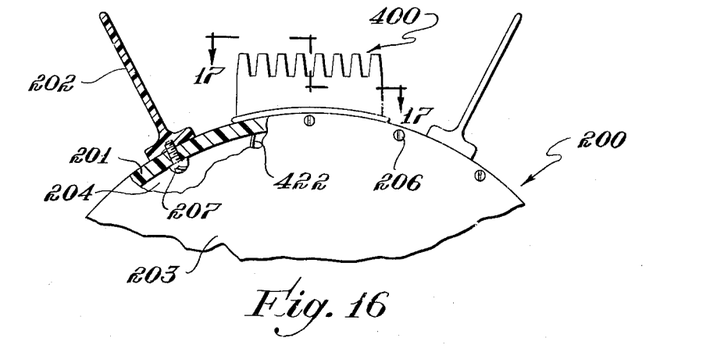
Fig. 16 is a partial plan view, with part of the housing in section, of an additional embodiment of a transmitting unit according to the invention.
Figures 17, 18:
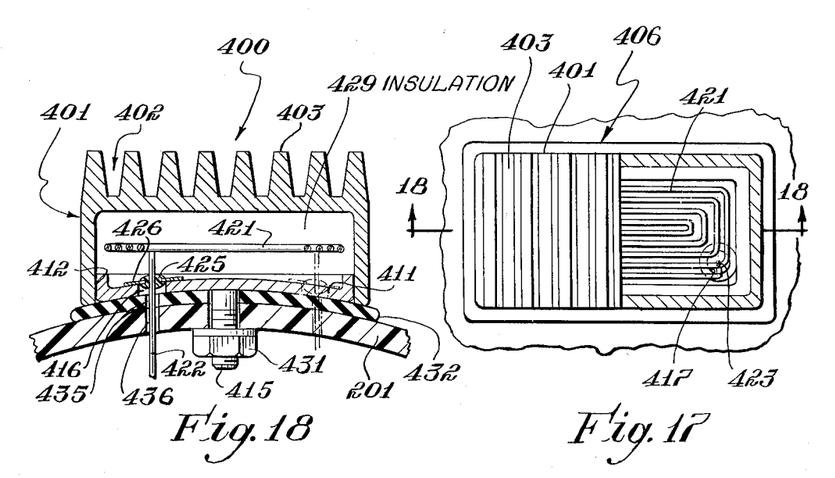
Fig. 17 is a section on lines 17—17 of Fig. 16.
Fig. 18 is a section on lines 18—18 of Fig. 17.

The embodiment shown in Figs. 16 to 18 has a housing 200 which is in all essentials quite similar to that shown in Figs. 14 and 15 and which is indicated with the same reference characters, namely, 201 for the tubular body, 202 for the fins, 203 for the upper, and 204 for the lower cover, 206 for the screws which fasten the covers to the housing body, and 207 for the mounting screws of the flanges.

The detecting element 400 is in this instance constructed as follows.

An essentially rectangular metal housing 401 is die cast, for example of copper or copper alloy, with a comparatively thick portion 402 which is then machined to form ribs 403. A cover 411, preferably curved to fit the housing body 201, is soldered, brazed or welded to the housing 401, as indicated at 412. A stud 415 is welded to the cover 411. The cover 411 has furthermore two holes, one of which is indicated at 416 in Fig. 18 whereas the other is indicated at 417 of Fig. 17. A flat coil 421 of high temperature coefficient material is mounted within the receptacle 401, 411 by means of its two end stems 422 and 423 by means of two conventional bead insulators, such as shown in Fig. 18 to comprise a glass body 425 and a flange 426. The glass bodies 425 surround the stem, 422 and 423 and the flanges 426 are soldered or otherwise fastened to the metal cover 411 of the element 400.

The element 400, containing the resistance element 421, is filled with a good heating conducting insulator 429 such as pyranol, alcohol, preston or hydrogen, which insulating material can be introduced by conventional methods, including injection by means of a hollow needle syringe.

The detecting element 400 is mounted on the housing body 201 by means of the stud 415 and a nut 431, as indicated in Fig. 18. A rubber gasket 432 is inserted between the housing 201 and the detector 400. The stems 422, 423 of the resistance element are led to the inside of the transmitter housing through holes of the gasket 432 and of the housing body 201, as indicated at 435 and 436 of Fig. 18.

The electric connections between the resistance element, for example six in number, are analogous to those herein described with reference to Figs. 1, 2, 6, 7 and 15.

It will be evident that the body 401, the resistance coil 422 and the insulating material 429 constitute so far as thermal conditions are concerned, a unitary member 400 whose temperature response is essentially independent of the housing 200 and of the other detector elements.

The operation of the embodiments above described with reference to Figs. 14 to 18 is identical to that described above with reference to Figs. 1 to 10.

It should be understood that the present disclosure is for the purpose of illustration only and that this invention includes all modifications and equivalents which fall within the scope of the appended claims.

We claim:

1. The telemetering system for remotely indicating the angular position of a force subject to rotation in a plane comprising, an even number of temperature-sensitive electrical resistors angularly spaced at equal intervals around a circle in said plane, angle discriminating means arranged so that the temperature and hence the electrical resistance of selected ones of said resistors corresponding in position to the instantaneous angular position of the force to be indicated are altered, oppositely disposed pairs of said resistors being connected as adjacent resistance legs in an electrical bridge circuit, a source of electric current connected to energize said bridge circuit, means for mounting said resistors on said angle discriminating means in essentially heat insulating relation thereto, and remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated.

2. The telemetering system for remotely indicating the angular position of a force subject to rotation in a plane comprising, an even number of temperature-sensitive electrical resistors angularly spaced at equal intervals around a circle in said plane, angle discriminating means arranged so that selected ones of said resistors corresponding in position to the instantaneous angular position of the force to be indicated are cooled and the electrical resistance thereof altered, oppositely disposed pairs of said resistors being connected as adjacent resistance legs in an electrical bridge circuit, a source of electric current connected to energize said bridge circuit, means for mounting said resistors on said angle discriminating means in essentially heat insulating relation thereto, and remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated.

3. The telemetering system for remotely indicating the angular position of a force subject to rotation in a plane comprising, an even number of temperature-sensitive electrical resistors angularly spaced at equal intervals around a circle in said plane, angle discriminating means arranged so that selected ones of said resistors corresponding in position to the instantaneous angular position of the force to be indicated are cooled and the electrical resistance thereof altered, oppositely disposed pairs of said resistors being connected as adjacent resistance legs in an electrical bridge circuit, a source of electric current connected to energize said bridge circuit and uniformly heat said resistors, means for mounting said resistors on said angle discriminating means in essentially heat insulating relation thereto, and remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneously angular position of the force to be indicated.

4. The telemetering system for remotely indicating the angular position of a force subject to rotation in a plane comprising, an even number of temperature-sensitive electrical resistors angularly spaced at equal intervals around a circle in said plane, angle discriminating means arranged so that selected ones of said resistors are relatively increased in temperature and altered in electrical resistance with respect to the others corresponding in position to the instantaneous angular position of the force to be indicated, oppositely disposed pairs of said resistors being connected as adjacent resistance legs in an electrical bridge circuit, a source of electric current connected to energize said bridge circuit, means for mounting said resistors on said angle discriminating means in essentially heat insulating relation thereto, and remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated.

5. The telemetering system for remotely indicating the angular position of a force subject to rotation in a plane comprising, an even number of temperature-sensitive electrical resistors angularly spaced at equal intervals around a circle in said plane, angle discriminating means arranged so that the temperature and hence the electrical resistance of selected ones of said resistors corresponding in position to the instantaneous angular position of the force to be indicated are altered, oppositely disposed pairs of said resistors being connected as adjacent resistance legs in an electrical bridge circuit, a source of electric current connected to energize said bridge circuit, means for mounting said resistors on said angle discriminating means in essentially heat insulating relation thereto, remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated and means to indicate a condition of balance for said bridge circuit.

6. The telemetering system for remotely indicating the angular position of a force subject to rotation in a plane comprising, an even number of temperature-sensitive electrical resistors angularly spaced at equal intervals around a circle in said plane, angle discriminating means arranged so that selected ones of said resistors corresponding in position to the instantaneous angular position of the force to be indicated are cooled and the electrical resistance thereof altered, oppositely disposed pairs of said resistors being connected as adjacent resistance legs in an electrical bridge circuit, a source of electric current connected to energize said bridge circuit, means for mounting said resistors on said angle discriminating means in essentially heat insulating relation thereto, remote indicating means responsive to the electric current flow for unbalance of said bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated and means to indicate a condition of balance for said bridge circuit.

7. The telemetering system for remotely indicating the angular position of a force subject to rotation in a plane comprising, an even number of temperature-sensitive electrical resistors angularly spaced at equal intervals around a circle in said plane, angle discriminating means arranged so that the temperature and hence the electrical resistance of selected ones of said resistors corresponding in position to the instantaneous angular position of the force to be indicated are altered, each of the oppositely disposed pairs of said resistors being connected as adjacent resistance legs in a respective electrical bridge circuit, a source of electric current connected to energize said bridge circuit, means for mounting said resistors on said angle discriminating means in essentially heat insulating relation thereto, and remote indicating means responsive to the electric current flow for unbalance of the respective bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated.

8. The telemetering system for remotely indicating the angular position of a force subject to rotation in a plane comprising, an even number of temperature-sensitive electrical resistors angularly spaced at equal intervals around a circle in said plane, angle discriminating means arranged so that the temperature and hence the electrical resistance of selected ones of said resistors corresponding in position to the instantaneous angular position of the force to be indicated are altered, each of the oppositely disposed pairs of said resistors being connected as adjacent resistance legs in a respective electrical bridge circuit, a source of electric current connected to energize said bridge circuit, means for mounting said resistors on said angle discriminating means in essentially heat insulating relation thereto, remote indicating means responsive to the electric current flow for unbalance of a respective bridge circuit including a plurality of impedances each connected with a respective resistor, the configuration of said impedances being such that the impedances bear the same angular relationship as their correlated resistors thereby to remotely indicate the altered resistance of the selected ones of said resistors corresponding in position to the instantaneous angular position of the force to be indicated and means to indicate a condition of balance for all of the respective bridge circuits.

9. The telemetering system for remotely indicating changes in wind conditions comprising, an even number of temperature-sensitive electrical resistors angularly spaced at equal intervals around a circle and in a common plane lying in the direction of flow of the wind, means for shielding the resistors so that only those facing the direction from which the wind flows are subjected to substantial cooling, oppositely disposed pairs of said resistors being connected as adjacent resistance legs in a respective electrical bridge circuit, a source of electric current connected to energize the respective bridge circuits and uniformly heat said resistors, means for mounting said resistors on said shielding means in essentially heat insulating relation thereto, means to balance all of the bridge circuits for a zero wind condition, and remote means responsive to the electric current flow of unbalance of a respective bridge circuit to remotely indicate the altered resistance of selected ones of said resistors due to the cooling effect of the wind blowing from a corresponding direction to the angular position of the selected ones of said resistors to thus indicate the angular direction of the wind.

10. The telemetering system for remotely indicating changes in wind conditions comprising, an even number of temperature-sensitive electrical resistors angularly spaced at equal intervals around a circle and in a common plane lying in the direction of flow of the wind, means for shielding the resistors so that only those facing the direction from which the wind flows are subjected to substantial cooling, oppositely disposed pairs of said resistors being connected as adjacent resistance legs in a respective electrical bridge circuit, a source of electric current connected to energize the respective bridge circuits and uniformly heat said resistors, means for mounting said resistors on said shielding means in essentially heat insulating relation thereto, means to balance all of the bridge circuits for a zero wind condition, remote means responsive to the electric current flow for unbalance of a respective bridge circuit to remotely indicate the altered resistance of selected ones of said resistors due to the cooling effect of the wind blowing from a corresponding direction to the angular position of the selected ones of said resistors to thus indicate the angular direction of the wind, and current-responsive means to indicate a condition of balance for all of the respective bridge circuits.

11. The telemetering system for remotely indicating changes in wind conditions comprising, an even number of temperature-sensitive electrical resistors angularly spaced at equal intervals around a circle and in a common plane lying in the direction of flow of the wind, means for shielding the resistors so that only those facing the direction from which the wind flows are subjected to substantial cooling, oppositely disposed pairs of said resistors being connected as adjacent resistance legs in a respective electrical bridge circuit, a source of electric current connected to energize the respective bridge circuits and uniformly heat said resistors, means for mounting said resistors on said shielding means in essentially heat insulating relation thereto, means to balance all of the bridge circuits for a zero wind condition, remote means responsive to the electric current flow for unbalance of a respective bridge circuit to remotely indicate the altered resistance of selected ones of said resistors due to the cooling effect of the wind blowing from a corresponding direction to the angular position of the selected ones of said resistors to thus indicate the angular direction of the wind, and galvanometer indicating means responsive in the zero indication to indicate a condition of balance for all of the respective bridge circuits.

12. The telemetering system for remotely indicating changes in wind conditions comprising, an even number of temperature-sensitive electrical resistors angularly spaced at equal intervals around a circle and in a common plane lying in the direction of flow of the wind, means for shielding the resistors so that only those facing the direction from which the wind flows are subjected to substantial cooling, oppositely disposed pairs of said resistors being connected as adjacent resistance legs in a respective electrical bridge circuit, a source of electric current connected to energize the respective bridge circuits and uniformly heat said resistors, means to balance all of the bridge circuits for a zero wind condition, remote means responsive to the electric current flow for unbalance of a respective bridge circuit to remotely indicate the altered resistance of selected ones of said resistors due to the cooling effect of the wind blowing from a corresponding direction to the angular position of the selected ones of said resistors to thus indicate the angular direction of the wind, and galvanometer indicating means responsive in the zero indication to indicate a condition of balance for all of the respective bridge circuits, said galvanometer being calibrated in terms of wind velocity to indicate the wind velocity by the total unbalanced current of the respective bridge circuits.

13. The electric signal transmitting unit for use in a telemetering system comprising a plurality of temperature-sensitive electrical resistors, a supporting plate upon which said resistors are mounted in electrical insulating relation, a plurality of partition walls radially disposed upon their edges at right angles to said plate and between said resistors, inner partition walls mounted upon their edges at right angles to said plate and separating the inner facing surfaces of said resistors from each other, a top cover plate fastened to the edge surfaces of the partition walls opposite the mounting plate, the arrangement of partition walls and plates being such as to form wind-receiving pockets for each of said resistors, and respective openings in the bottom plate to communicate with each of the wind-receiving pockets.

14. In a device for measuring the direction of flow of a fluid generally in a predetermined plane, the combination of a transmitter including a housing of non-metallic, poorly heat-conducting material located at a predetermined control point at which it is subjected to impingement by flow of the fluid from all directions; at least three temperature-sensitive impedance elements mounted on said housing in essentially minimal heat transferring relation thereto and with at least part thereof on the outside of the housing, said elements being respectively associated with spaced portions of the housing in spaced non-linear arrangement and in a plane generally parallel to said predetermined plane so as to be primarily affected by fluid flow in different predetermined directions respectively, whereby said elements will have a resultant temperature differential condition characteristic of the fluid flow direction; and a receiver located at an observation point remote from said transmitter and comprising a ratiometer including a plurality of deflecting coils, each connected in a circuit with a source of current and with one of said elements, the different temperatures of said elements caused by the fluid flow acting to control the current through each of said coils respectively in a manner corresponding to the temperatures of the respective elements as determined by the fluid flow direction and means to indicate the flow direction according to the relative strengths of the coil currents.

15. Device according to claim 14 further comprising fins of poorly heat conducting material which extend from said housing intermediate said impedance elements.

16. In a device for measuring the direction of flow of a fluid, the combination of a transmitter including a housing having wall portions exposed to said flow and made of non-metallic, poorly heat-conducting material, and mounted on said housing in essentially minimal heat transferring relation thereto and at angularly spaced intervals, at least three temperature-sensitive impedance elements with at least part of each element likewise exposed to said flow outside of its wall portion, each element having a metallic body and in heat conductive relation therewith a resistance element, whereby the impedance elements are differentially affected by temperature differences at the exposed elements due to the instantaneous angular position of the elements relatively to the flow.

17. Device according to claim 16 wherein said impedance element comprises a metallic body outside of a respective wall portion, a metallic rod leading from said body through said wall portion, and on said rod a resistance element.

18. In a device for measuring the direction of flow of a fluid, the combination of a transmitter including a housing having wall portions exposed to said flow and made of non-metallic, poorly heat conducting material and at least three temperature-sensitive impedance elements each including a receptacle containing resistor means imbedded in heat conducting insulating material and means for fastening the receptacle to the outside of a respective wall portion, said impedance elements being mounted at angularly spaced intervals on said housing with at least part of each element likewise exposed to said flow outside of its wall portion, each element having a metallic body and in heat conductive relation therewith a resistance element, whereby the impedance elements are differentially affected by temperature differences at the exposed elements due to the instantaneous angular position of the elements relatively to the flow.

19. Remote indicating means for use in a telemetering system of the type having an even number of temperature-sensitive resistors radially disposed about a circle with resistors of respective pairs arranged oppositely of each other in a common plane and electrically connected as elements of respective bridge circuits, comprising: a plurality of electromagnet coils equal in number to the number of said temperature-sensitive resistors and radially disposed with coils of respective pairs arranged oppositely of each other about a circle in a common plane in angular positions corresponding to the angular positions of said resistors, the opposite coils of said pairs of coils being physically arranged so that their magnetic polarity is in opposite sense, and electrically connected in series across the output terminals of the respective bridge circuit for the correspondingly positioned opposite pair of resistors as the measuring branch of the bridge; a magnetic circuit connecting the magnetic fields of said magnet coils; and a magnetized indicator pointer pivotally mounted to rotate in accordance with the distribution of the magnetic fields in said magnetic circuit.

References Cited in the file of this patent

UNITED STATES PATENTS

| | | |
|---|---|---|
| 1,841,607 | Kollsman | Jan. 19, 1937 |
| 2,444,410 | Keinath | June 29, 1948 |
| 2,496,339 | De Giers et al. | Feb. 7, 1950 |